(No Model.)
T. BUMANN.
OIL CAN AND SIPHON PUMP.
No. 486,760. Patented Nov. 22, 1892.
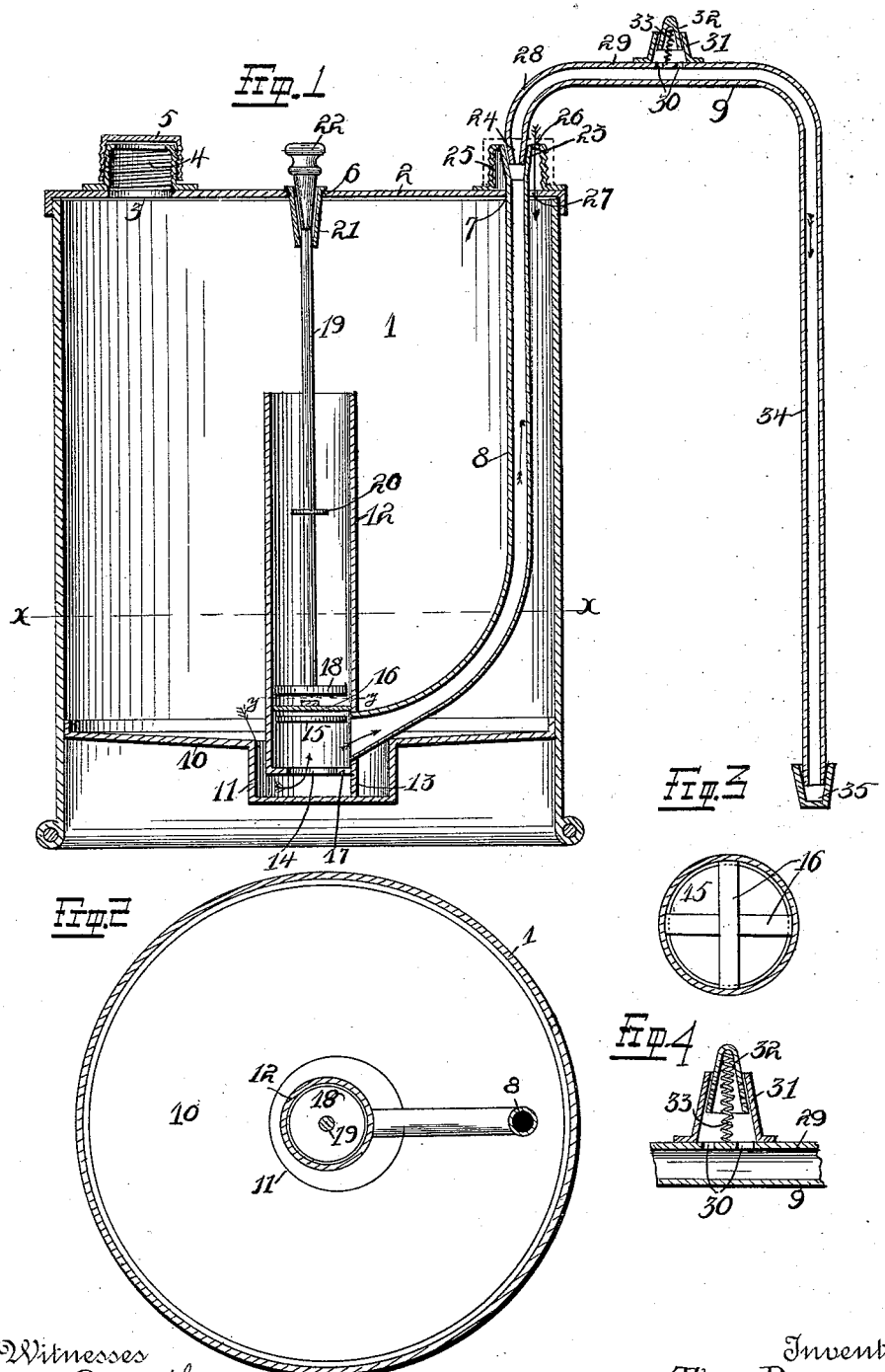
Witnesses
Alfred A. Eicks
Herbert S. Robinson
Inventor
Theo. Bumann
By his Attorneys
Higdon & Higdon & Longan

UNITED STATES PATENT OFFICE.

THEODORE BUMANN, OF BUNKER HILL, ILLINOIS.

OIL-CAN AND SIPHON-PUMP.

SPECIFICATION forming part of Letters Patent No. 486,760, dated November 22, 1892.

Application filed May 2, 1892. Serial No. 431,443. (No model.)

*To all whom it may concern:*

Be it known that I, THEODORE BUMANN, of the city of Bunker Hill, Macoupin county, and State of Illinois, have invented certain new and useful Improvements in Oil-Cans and Siphon-Pumps, of which the following is a full, clear, and exact description, reference being had to the accompanying drawings, forming a part hereof.

My invention relates to improvements in oil-cans and siphon-pump attachments; and it consists in the novel arrangement of the combination of parts, as will be more fully hereinafter described, and designated in the claim.

In the drawings, Figure 1 is a vertical longitudinal section of my complete invention. Fig. 2 is a horizontal cross-section taken on the line $x\,x$ of Fig. 1. Fig. 3 is a horizontal cross-section of a portion of my invention, taken on the line $y\,y$ of Fig. 1. Fig. 4 is a detail sectional view of a part of the siphonic attachment.

The object of my present invention is to improve upon the construction shown and described in my former United States patent, No. 456,758, granted to me July 28, 1891.

Referring to the drawings, 1 indicates the receptacle itself, which may be constructed of any suitable material and made of any dimensions desirable without affecting the functional operation of my device.

2 indicates the lid of the receptacle, so contructed that when applied to the same it forms as nearly as possible an air and water tight joint. Said lid 2 is provided with a perforation 3, surmounted by a screw-threaded nozzle 4, over which a screw-threaded cap 5 is adapted to be screwed, said nozzle 4 answering as a supply-orifice for the receptacle. Said lid 2 is also provided with a perforation 6, for the purpose hereinafter set forth, and a perforation 7, adapted to permit the passage of the fixed tube 8 of the siphon 9.

10 indicates the bottom of the receptacle 1, the same being provided with a downwardly-projecting cavity 11, and said cavity 11 being in direct communication with the interior space of the receptacle 1. The bottom 10 occupies a position a sufficient distance above the lower edge of the walls of the receptacle, as shown in Fig. 1, in order to permit the suspension of the cavity 11 below the bottom 10, and still not come in contact with the floor, table, or whatever object it may be desired to place the device upon. The bottom 10 of said receptacle 1 slopes downwardly and convergingly toward said cavity 11, as can be perceived by referring to Fig. 1, such construction being desirable in order to drain all the liquid from said bottom into the cavity 11.

Having given a description of the peculiar construction of the receptacle, I will now proceed to describe the siphonic attachment in detail.

Referring to the siphonic attachment, 12 indicates a cylinder having on its lower end a projection or ear 13 to support said cylinder a suitable distance above the bottom of the cavity 11, as will be more fully hereinafter described. Said cylinder 12 has in its lower end a perforation 14, through which the liquid passes into said cylinder, the projection or ear serving to keep the bottom 14 of the cylinder 12 above the bottom of the cavity 11 a sufficient distance to allow the ready flow of the liquid into said cylinder when the device is in operation. Over said perforation 14 and inside of said cylinder 12 is fitted an ordinary lift-valve 15, which is constructed to move upwardly in the cylinder 12; but the extent of said movement is limited by a valve-cage 16, which may be of any construction desirable; but I find it a plurality of strips horizontally and transversely crossed, as preferable. (See Fig. 3 for illustration.) The downward movement of said valve 15 is limited by an annular flange 17 on the bottom of said cylinder 12. Adapted to fit in the upper part of said cylinder 12 is a piston 18, provided with a piston-rod 19. The upward stroke of said piston is limited by a shoulder or projection 20, formed on or attached to said piston-rod at a relative distance between the piston 18 and a downwardly-projecting conical-shaped socket 21, with which said shoulder 20 comes in contact, thus limiting the stroke of the piston. This socket 20 is fitted in and projects downwardly from the aforesaid perforation 6 in the lid 2. On the upper and outer end of said piston-rod 10 is secured a combined knob, handle, or plug 22. Said knob or handle or plug having correspondingly-inclined outer surfaces to fit into said socket 21, so as to form a perfectly air-tight joint. The aforesaid tube 8 is fixed to the cylinder 12 near the lower end in any suitable and mechanical manner, and its lower end is in direct communication with the interior of said cylinder. Said tube passes upward, as shown in Fig. 1, and terminates with the flared upper portion 23, into which the tapered leg 24 of the siphon 9 is adapted to fit and form a tight joint when the siphonic attachment is in use. The piston 19 is adapted to work loosely in a vertical direction in the cylinder 12.

Having given an explicit description of the receptacle and the interior siphonic attachment therefor, I will now proceed to describe the peculiar construction of the siphon which I employ in carrying out my invention.

Over the flared end 23 of the tube 8 is to be secured a nozzle 25, having exterior screw-threads, over which an adjustable cap (shown in dotted lines in Fig. 1) is adapted when the device is not in use and the siphon detached. In the upper edge of the screw-threaded nozzle 25 is a vent-hole 26, co operating with the similar aperture 27 in the lid 2 and forming a sufficient vent-passage through the nozzle independent of the leg 28 of the siphon 9 and the tube 8 and allowing an ingress of air into the interior of the receptacle to facilitate the operation of the siphon. In the upper wall 29 of the portion of the siphon 9 are vent-passages 30, for the purpose more fully hereinafter described. Secured to the wall 29 of the siphon 9 is a frustro-conical valve-seat 31, having converging sides, in which fits a small valve 32 of similar shape, which is normally forced and held away from the wall of said siphon by means of a spring 33, which is secured to the wall of the siphon and under the small end of the valve 32. The tension of said spring serves to hold the valve upward into the smaller end of the valve-seat, thus making a perfectly-tight joint. The siphon 9 is provided with a long leg 34, upon the lower end of which there is fitted a small cap 35 to collect the drippings or waste of the liquid that has accumulated in said leg 34 after the flow of the liquid has ceased. The valve 32, located on the siphon 9, is to permit the ingress of air into said siphon for stopping the flow of liquid when desired, which operation requires no further description.

Having described the mechanical parts of my invention, I will now proceed to describe the operation of same.

The parts are made and put together substantially as shown in Fig. 1. The receptacle may be then filled with any liquid, and in order to draw off the same the operator should first lift the piston and then force the same down quickly. This action starts the liquid upwardly in the tube 8 and through the siphon 9, and it is only necessary to open the valve 32 by compressing same, allowing the ingress of air to stop the flow of the liquid. I can also stop the flow of the liquid by raising the piston quickly, and in that case it is not necessary to compress said valve 32.

Having fully described my invention, what I claim is—

The herein-described oil-can and siphon-pump, consisting of a receptacle 1, a cylinder 12, disposed therein and having an open bottom and top, a piston 18, working in the cylinder and provided with a piston-rod 19, a fixed siphon-tube 8, communicating with the cylinder at its lower end, a valve 15, working in the cylinder across the opening of the tube 8, a siphon 9, detachably connected with the tube 8, and an inwardly-yielding valve provided at the exterior of the siphon, all arranged and adapted to operate substantially as and for the purpose set forth.

In testimony whereof I affix my signature in presence of two witnesses.

THEODORE BUMANN.

Witnesses:
C. K. JONES,
E. E. LONGAN.